L. E. HOELSCHER.
UNLOADING DEVICE RELATIVE TO UNLOADING FODDER.
APPLICATION FILED JAN. 20, 1919.

1,415,034.

Patented May 9, 1922.
2 SHEETS—SHEET 1.

Inventor:
Louis E. Hoelscher.
By L. G. Kleteter
atty.

L. E. HOELSCHER.
UNLOADING DEVICE RELATIVE TO UNLOADING FODDER.
APPLICATION FILED JAN. 20, 1919.
1,415,034.  
Patented May 9, 1922.  
2 SHEETS—SHEET 2.
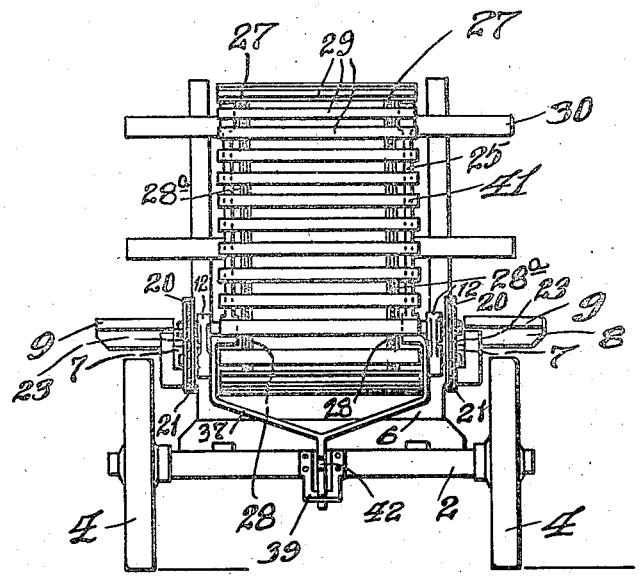
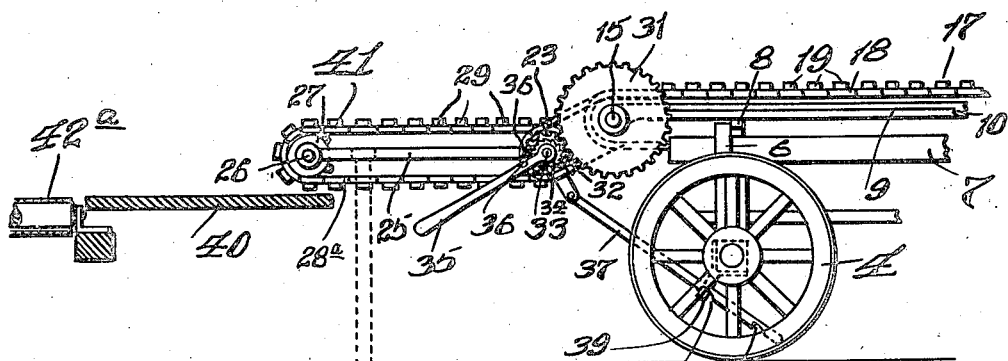

UNITED STATES PATENT OFFICE.

LOUIS E. HOELSCHER, OF ST. LOUIS, MISSOURI.

UNLOADING DEVICE RELATIVE TO UNLOADING FODDER.

1,415,034. Specification of Letters Patent. Patented May 9, 1922.

Application filed January 20, 1919. Serial No. 272,083.

*To all whom it may concern:*

Be it known that I, LOUIS E. HOELSCHER, a citizen of the United States of America, and a resident of the city of St. Louis and State of Missouri, have invented certain new and useful Improvements in an Unloading Device Relative to Unloading Fodder, of which the following is a specification.

The primary object of this invention is to provide an improved unloading device which is attached to a wagon, said device being applicable to the unloading of fodder and the like to the feeding table of an ensilage cutter.

Another object is to provide a wagon having a conveyor forming a portion of the wagon bed so that the fodder or the like which has been previously loaded on the wagon can be fed from the wagon rearwardly to a cutting or chopping device, thereby eliminating the heretofore manual unloading and piling of the fodder relative to feeding the same into the cutter.

Other and further objects will appear in the specification and be specifically pointed out in the appended claims, reference being had to the accompanying drawings exemplifying the invention, and in which, Figure 1 is a longitudinal section of a wagon showing this improved unloading device applied thereto.

Figure 3 is a rear elevation showing the overlapping conveyor in an elevated position, and serving as an end tail to the wagon.

Figure 4 is a fragmentary view showing the overlapping conveyor in a position of overlapping the feed table of the cutter, said view also showing a hand operating mechanism for operating said conveyor, and a main conveyor.

Figure 1:
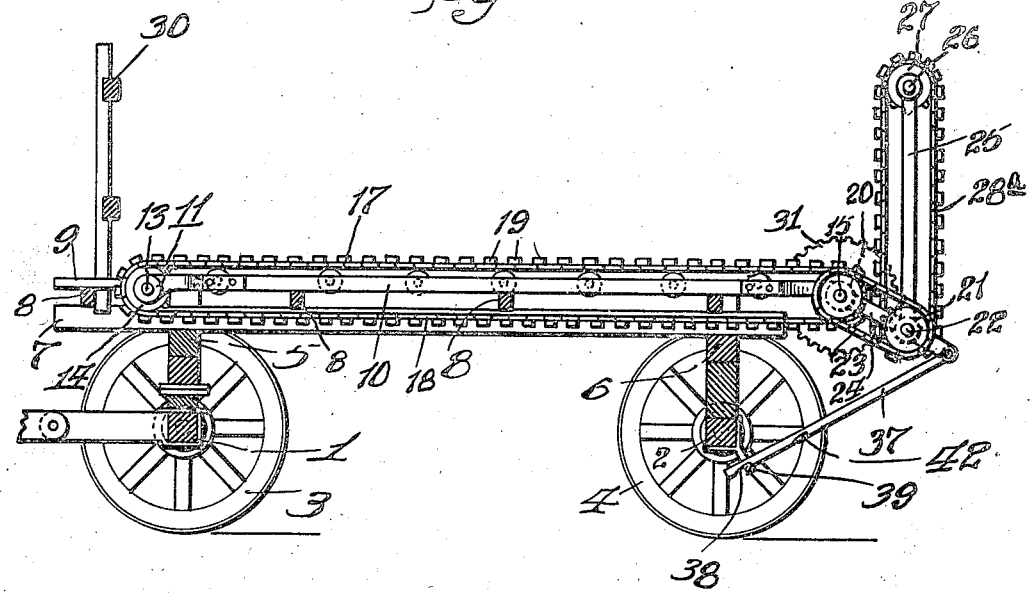
Figure 2:
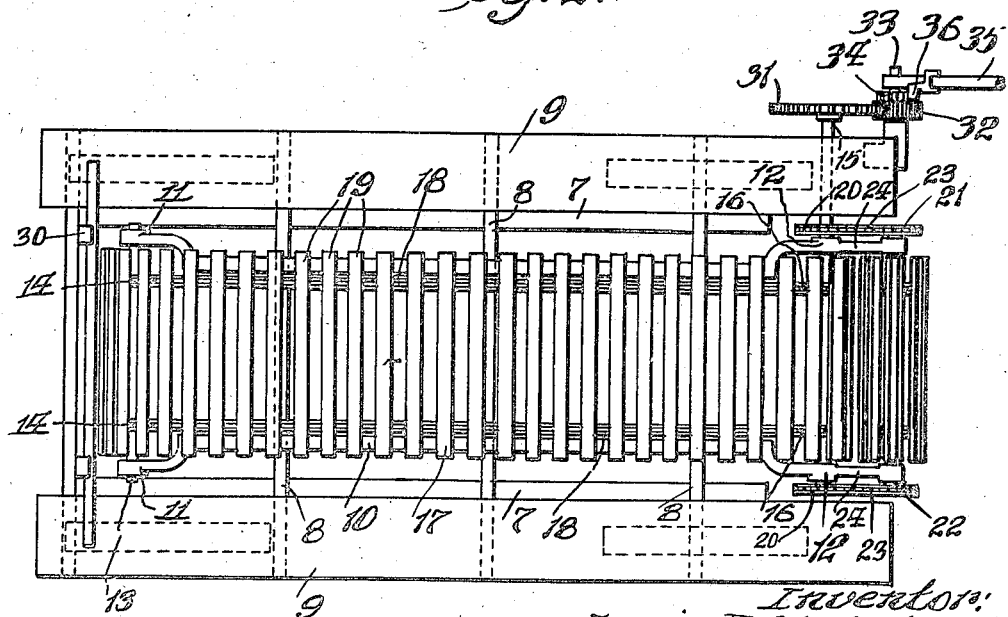
Figure 2 is a plan view of Fig. 1.

Referring to the drawings the running gear of the wagon comprises the usual front and rear axles 1 and 2, said axles 1 and 2 being mounted on their respective front and rear wheels 3 and 4. Mounted on said axles are the usual supporting yokes 5 and 6, respectively, said yokes supporting a pair of longitudinally arranged members 7.

Mounted transversely across said members 7 are a plurality of cross members 8, the outer ends of said members 8 supporting the side members 9. Secured to some of the cross members 8 is a conveyor supporting frame 10, and mounted to each end of said frame are a pair of bearings 11 and 12, respectively, the bearings 11 being located adjacent the front of the wagon bed. Mounted in the bearings 11 is a transversely and horizontally arranged shaft 13, and mounted on said shaft are a pair of sprockets 14.

Mounted in the bearings 12 is a transversely and horizontally arranged shaft 15, and secured to said shaft are a pair of sprockets 16; said sprockets 14 and 16 are for the reception of a main conveyor 17 which comprises a pair of sprocket engaging chains 18, to which are secured transversely arranged slats 19, the upper lap of said conveyor being arranged on a horizontal plane above the side members 9.

Mounted on each end of the shaft 15 adjacent each of the sprockets 16 is a sprocket 20, each of said sprockets 20 being co-operable with a sprocket 21, said sprockets 21 being mounted on a transversely and horizontally arranged shaft 22. Mounted on each alining pair of sprockets 20 and 21 is a chain 23. The shaft 22 is supported by a pair of hangers 24, each of said hangers extending from each of the bearings 12 of the shaft 15. Said shaft 22 is also mounted in bearings which form part of a swinging frame 25, and mounted on said frame at the end opposite to the shaft 22 is a horizontally arranged shaft 26, having a pair of sprockets 27 secured thereto, said sprockets being in alinement with a pair of sprockets 28 that are mounted on the shaft 22, each pair of alining sprockets 28 and 27, respectively, having a chain 28ª mounted thereon, and secured to said chains are a plurality of slats 29, said swinging frame 25, shafts 22 and 26, sprockets 28 and 27, and parts co-operable therewith, providing an overlapping conveyor, which when mounted, as shown in Fig. 1, serving as a rear end tail relative to the wagon bed, and to the front end tail 30.

Looking towards the front of the wagon and on the left hand side adjacent the rear is a conveyor moving mechanism, comprising a gear 31 which is secured to the shaft 15, a gear 32 in mesh with said gear 31, said gear being loosely mounted on a stub shaft 33, a ratchet gear 34 secured to said gear 32, and a lever 35 loosely mounted on the shaft 33, carrying a ratchet pawl 36.

When this improved unloading device is mounted on a wagon, and fodder is loaded thereon, the stalks being laid transversely of the wagon bed and on the main conveyor, the fodder is sustained in loaded position by the vertically held swinging frame 25 and the front end tail 30, as shown in Fig. 1, said frame 25 being held in its vertical position by the tripping yoke 37, which is swingingly mounted at one end to the lower end of the swinging frame 25, the opposite end of said yoke having a notch 38 formed thereon, said notch engaging an arresting member 39 which is carried by the rear axle 2. An engaging notch 42 is also formed in the yoke 37 for the purpose of engaging the member 39 when the swinging conveyor is in a horizontal position.

After a load of fodder has been brought adjacent the cutter, the wagon is backed to a position adjacent the table 40 of the cutter, and the tripping yoke 37 is released from engagement with the member 39, thereby allowing the overlapping conveyor 41 to be lowered to an approximate horizontal position, so that the extending end thereof will overlap the feed table 40. The lever 35 is then engaged by the operator and worked with a short reciprocating stroke, the pawl 36 engaging the teeth of the ratchet gear 34, thereby turning the gears 32 and 31 and imparting motion to the main conveyor 17, and causing the fodder mounted thereon to ride onto the overlapping conveyor 41, said conveyor also being put in motion and feeding forward towards the feed table 40, through the chains 23 and their respective sprockets, and as the fodder is fed off the conveyor 41, it will be deposited on the feed table 40, from which the cutter operator can draw the fodder from the table to the conveyor 42ª of the cutter.

It is to be noted that the stalks of the load will be mounted on the conveyor 17 transversely thereof, so that they will be fed to the feed table 40 in a position lengthwise thereof, said lengthwise position being the proper arrangement relative to feeding the stalks into the cutter, as said stalks are fed lengthwise onto the cutter conveyor.

On account of the uppermost lap of the conveyor being loaded on a plane above the pair of side members 9, the greater part of the weight of the stalks will be borne by the upper lap of the conveyor, such an arrangement assisting the feeding operation of the stalks as the stalks cannot be wiped from the conveyor as they would be if too much frictional contact were given to the stalk ends if they rested too solidly on the side members 9.

In a device of this character, it is to be noted that considerable labor can be done away with relative to the unloading of fodder adjacent the cutter, as heretofore the fodder has been conveyed manually from the wagon to the cutter, and in some instances, the fodder is piled on the ground in lengthwise order, from which it must again be handled relative to the final depositing of the stalks in lengthwise order on the feed table.

What I claim is:

1. An unloading device comprised of a wagon bed, a conveyor arranged longitudinally thereof, the uppermost lap of which provides the central load sustaining portion of said wagon bed, and there being a horizontally extending member arranged on each side of said conveyor on a plane beneath the uppermost lap thereof.

2. A wagon bed having a main conveyor horizontally arranged thereon forming the load sustaining center of the wagon bed, a side member paralleling said conveyor arranged on each side below the upper surface thereof, a swingingly mounted conveyor located adjacent one end of said main conveyor, said swingingly mounted conveyor being operably related to said main conveyor and adapted to be moved to both a right angled position and a horizontal position relative to said main conveyor, and supporting means depending from said swinging conveyor for holding it in either of its positions.

3. A wagon having a main conveyor horizontally arranged thereon forming the longitudinal center of the wagon bed, a swingingly mounted conveyor located adjacent one end of said main conveyor, and having one end located on a plane beneath one end of said main conveyor, a side member located on a plane beneath the top surface of said main conveyor on each side thereof, said swingingly mounted conveyor being operably related to said main conveyor and adapted to be moved to a right angled position relative to said main conveyor.

4. A wagon bed having a main conveyor horizontally arranged thereon forming the supporting platform for the load, a swingingly mounted conveyor located adjacent one end of said main conveyor, said swingingly mounted conveyor being operably related to said main conveyor and adapted to be moved to a right angled position relative to said main conveyor, and means swingingly secured to one end of said swingingly mounted conveyor in engagement with a portion located beneath the wagon bed for holding said conveyor in its vertical position.

5. A wagon having a horizontally arranged main conveyor mounted thereon forming the load sustaining center of the wagon bed, an approximate vertically arranged front end tail located at one end of said conveyor, and an approximate vertically arranged rear end tail located at the opposite end of said conveyor comprising a swingingly mounted conveyor operably related to said main conveyor, said swingingly mounted conveyor adapted to be swung to a horizontal position on a plane below said main conveyor, and adjusting means depending from said swinging conveyor for engagement with a portion beneath the wagon for holding said swinging conveyor in either of its positions.

LOUIS E. HOELSCHER.